United States Patent
Barupati et al.

(10) Patent No.: US 11,349,384 B2
(45) Date of Patent: May 31, 2022

(54) ENERGIZATION OF A CONVERTER INCLUDING A MIX OF HALF-BRIDGE AND FULL-BRIDGE SUBMODULES

(71) Applicant: Hitachi Energy Switzerland AG, Baden (CH)

(72) Inventors: Praveen Kumar Barupati, Ludvika (SE); Ying Jiang-Häfner, Ludvika (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/964,741

(22) PCT Filed: Feb. 23, 2018

(86) PCT No.: PCT/EP2018/054494
§ 371 (c)(1),
(2) Date: Jul. 24, 2020

(87) PCT Pub. No.: WO2019/161907
PCT Pub. Date: Aug. 29, 2019

(65) Prior Publication Data
US 2020/0350767 A1 Nov. 5, 2020

(51) Int. Cl.
*H02M 1/36* (2007.01)
*H02M 7/483* (2007.01)
(Continued)

(52) U.S. Cl.
CPC ............ *H02M 1/36* (2013.01); *H02M 7/483* (2013.01); *H02J 3/36* (2013.01); *H02M 1/0077* (2021.05); *H02M 7/4835* (2021.05)

(58) Field of Classification Search
CPC ........... H02M 2001/0077; H02M 1/36; H02M 7/483; H02M 2007/4835; H02M 7/49; H02M 7/797; H02J 3/36
See application file for complete search history.

(56) References Cited

U.S. PATENT DOCUMENTS 10,461,534 B2* 10/2019 Pan ................. H02J 3/1807
2008/0284249 A1* 11/2008 Datta ................. H02J 3/36
307/36
(Continued)

FOREIGN PATENT DOCUMENTS

CN 105207504 A 12/2015
CN 204967648 U 1/2016
(Continued)

OTHER PUBLICATIONS

International Search Report and Written Opinion dated Nov. 12, 2018 for International Application No. PCT/EP2018/054494, 11 pages.
(Continued)

*Primary Examiner* — Fred E Finch, III
(74) *Attorney, Agent, or Firm* — Sage Daily Docket (57) ABSTRACT

Methods of energizing converters, and converter stations thereof, based on a mix of half-bridge (HB) converter cells and full-bridge (FB) converter cells are provided. According to one embodiment, a method for energizing a converter may include establishing a direct electrical connection between DC terminals of a converter, electrically connecting the converter to an AC power source via AC connectors and obtaining, from the AC power source and for a certain period of time, an AC voltage between two electrical phase lines for charging capacitors of the FB cells connected to the two electrical phase lines. Accordingly, the FB cells will be charged to a higher value and they may be controlled for charging capacitors of the HB submodules to at least a minimum voltage required to start switching devices of the HB submodules by drawing power from the AC power source.

20 Claims, 5 Drawing Sheets

(51) Int. Cl.
*H02J 3/36* (2006.01)
*H02M 1/00* (2006.01)

(56) References Cited

U.S. PATENT DOCUMENTS

| | | | |
|---|---|---|---|
| 2009/0196077 A1* | 8/2009 | Lee | H02J 3/36 363/35 |
| 2013/0322131 A1* | 12/2013 | Sun | H02J 3/36 363/35 |
| 2015/0145252 A1* | 5/2015 | Lin | H02M 7/19 290/44 |
| 2015/0256093 A1* | 9/2015 | Gupta | H02M 5/4585 363/35 |
| 2016/0056727 A1 | 2/2016 | Mukunoki et al. | |
| 2016/0294276 A1* | 10/2016 | Onishi | H02M 1/36 |
| 2017/0126008 A1* | 5/2017 | Shen | H02M 7/04 |
| 2018/0062498 A1* | 3/2018 | Fujii | H02H 7/1252 |
| 2019/0068076 A1* | 2/2019 | Uda | H02H 7/1257 |
| 2019/0252885 A1* | 8/2019 | Lu | H02M 7/483 |
| 2019/0326770 A1* | 10/2019 | Ding | H02M 7/219 |
| 2019/0386578 A1* | 12/2019 | Kajiyama | H02M 1/32 |
| 2020/0076321 A1* | 3/2020 | Ding | H02J 7/345 |
| 2020/0220471 A1* | 7/2020 | Kikuchi | H02M 5/4585 |
| 2020/0313571 A1* | 10/2020 | Andersson | H02J 3/36 |

FOREIGN PATENT DOCUMENTS

| | | |
|---|---|---|
| CN | 106487033 A | 3/2017 |
| CN | 106712238 A | 5/2017 |
| CN | 106787087 A | 5/2017 |
| CN | 107317472 A | 11/2017 |
| CN | 107453635 A | 12/2017 |
| CN | 107681877 A | 2/2018 |

OTHER PUBLICATIONS

Xu, Jianzhong, et al., "Start-Up Control and DC Fault Ride-Through Strategies of a Hybrid MMC-HVDC System Suitable for Overhead Line Transmission", 2015 IEEE 2nd International Future Energy Electronics Conference, Nov. 1, 2015, 6 pages.

Xie, Yeyuan, et al., "Self-Powered Fault Damper for Realizing Fast Recovery of VSC-HVDC System"; Electric Power Automation Equipment, vol. 37, No. 7, Jul. 31, 2017, 7 pages. (English Abstract provided).

Office Action and Search Report dated Sep. 29, 2020 for Chinese Patent Application No. 2018800031449, 10 pages.

* cited by examiner

ENERGIZATION OF A CONVERTER INCLUDING A MIX OF HALF-BRIDGE AND FULL-BRIDGE SUBMODULES

CROSS-REFERENCE TO RELATED APPLICATIONS

This application is a 35 U.S.C. § 371 national stage application of PCT International Application No. PCT/EP2018/054494 filed on Feb. 23, 2018, the disclosure and content of which is incorporated by reference herein in its entirety.

TECHNICAL FIELD

The present disclosure generally relates to the field of power transmission systems to transfer or receive high-voltage direct current, HVDC, electrical power. More specifically, the present disclosure relates to the energization, or the start-up procedure, of a converter (or converter station) including a valve arm based on a mix of half-bridge and full-bridge submodules.

BACKGROUND

Due to their lower losses and costs, high-voltage direct current (HVDC) power transmission systems have become the preferred option over their high-voltage alternating current (HVAC) competitors for bulk transmission of electrical power. In modern HVDC power transmission systems (with voltages of several hundred of kV), the power may reach several gigawatts in size and be transferred over distances of up to several thousands of kilometers.

At each end of a HVDC power transmission system, converter stations may be used to convert between AC and DC electrical power. Converter stations based on current-source converters (CSCs) using thyristors as switching devices have been widely used in HVDC applications. However, with recent development of semiconductor technology, voltage-source converters (VSCs), using e.g. insulated-gate bipolar transistors (IGBTs) as switching devices, have gained in popularity as they are self-commutating and less sensitive to commutation failures.

A VSC may for example be a modular multilevel converter (MMC) including cells or submodules (SMs) comprising switching devices such as IGBTs and an energy storage element such as a capacitor. The switching devices may be arranged in a full-bridge, FB, submodule or FB cell, in which four switching devices or units, each including an insulated-gate bipolar transistor (IGBT) together with a parallel freewheeling diode, are connected in an H-bridge configuration together with a charge up capacitor, or in a half-bridge, HB, submodule or HB cell, in which two switching devices (or units) are connected in series together with a parallel charge up capacitor. Examples of FB cells and HB cells will be described with reference to FIGS. 1 and 2, respectively.

Cells of MMCs may include capacitors as energy storage elements for the operation/commutation of the IGBTs and there is therefore a need to initially charge these capacitors before the converter can start operating. The capacitors may be charged using electrical power from either an AC power source (at the AC side) or a DC transmission system (at the DC side), depending on the symmetry offered by the arrangement of the switching devices.

However, in case of a VSC based on a mix of HB cells and FB cells, the capacitors will charge unevenly. In particular, using charging from the AC side, which is the most general way of charging MMCs, the capacitors of the HB cells will be charged to very low value as compared to the capacitors of the FB cells. Further, the charging level reached in both the HB cells and the FB cells may not be sufficient to start operating the switching devices.

There is therefore a need for improved methods, and associated converter stations, for energization of converters based on a mix of FB cells and HB cells.

SUMMARY

To at least partially fulfil the above requirements, the present disclosure seeks to provide at least an improved method of starting operation (or method of energization) of a converter and a corresponding converter station. The present disclosure relates also to the startup procedure (or energization) of a converter of a converter station including at least two series-connected converters.

To achieve this, methods of starting operation of a converter, and converter stations thereof, as defined in the independent claims, are provided. Further embodiments are provided in the dependent claims.

According to one aspect, a method of starting operation of a converter of a HVDC converter station is provided. In this method, the converter is an MMC including, at a DC side, two DC terminals for connection to a DC transmission system and, at an AC side, AC connectors connectable to electrical phase lines of an AC power source. The converter includes valve arms, each connected between a DC terminal and an AC connector for connection to one electrical phase line, and each valve arm includes at least one FB submodule and at least one HB submodule connected in series. In other words, the FB submodules and the HB submodules are connected in series between an AC electrical phase line and one of the DC terminals of the converter.

The method may include establishing a direct electrical connection between the DC terminals of the converter and electrically connecting the converter to the AC power source via the AC connectors. An AC voltage may then be obtained, from the AC power source and for a certain period of time, between two electrical phase lines for charging capacitors of the FB submodules connected to the two electrical phase lines. After said period of time, switching devices of the FB submodules may then be controlled for charging capacitors of the HB submodules to at least a minimum voltage required to start switching switching devices of the HB submodules (by drawing power from the AC power source).

The minimum voltage required to start switching the switching devices of the HB submodules may also be referred to as the HB submodule "deblock" voltage. This minimum voltage corresponds to the voltage at which the HB submodules (or at least the switching devices of the HB submodules) can start operating.

In the converter of the present aspect, each valve arm may include at least one FB cell and at least one HB cell, i.e. a mix of FB and HB cells. In its simplest construction, i.e. in some embodiments, a valve arm may include an equal number of FB cells and HB cells such as one FB cell and one HB cell. However, other compositions (or mixes) of FB and HB cells may be envisaged.

In the present disclosure, the terms cell and submodule may be used interchangeably to refer to a FB cell or a FB submodule, or to an HB cell or an HB submodule.

It will be appreciated that combining both FB cells and HB cells in series in a valve arm of a converter station may be of interest in that the resulting valve arm does not suffer from the disadvantages of having only FB cells connected in series (which may result in higher losses and higher costs) or having only HB cells connected in series (which may result in lower control features).

Turning to the charging of MMCs in general, or rather the charging of the capacitors of valve arms including FB cells and/or HB cells, a general way of charging these capacitors is to use electrical power from an AC power source. When an AC breaker connecting the converter to the AC lines is closed, an AC line-to-line voltage, i.e. a voltage between the electrical line of a first phase (e.g. phase A) and the electrical line of a second phase (e.g. phase B), will appear across the two phase's positive and negative valve arms, thereby charging the capacitors of the cells.

It will be appreciated that, in blocked conditions, HB cells can charge only in one direction of current while FB cells can charge in both directions.

Thus, in case of valve arms including only HB cells, one of the phase valve arms is bypassed and the capacitors of the other valve arm are charged to the AC line-to-line voltage. During this charging process, the capacitors of the HB cells can be charged to approximately 85% of their nominal values, depending on the level of the voltage peak of the AC line-to-line voltage.

In case of valve arms including only FB cells, the AC line-to-line voltage will fall across the series connection of the two valve arms charging each valve arm to half of the line-to-line voltage, which corresponds to half of the value obtained in the case of valve arms based only on HB cells. During this charging process, the DC voltage remains at zero volts and the capacitors of the FB submodules are charged to approximately 43% of their nominal values.

However, as mentioned above, in the case of a valve arm including, for example, at least one HB cell and at least one FB cell, i.e. a mix of HB and FB cells, the capacitors between the cells are charged very unevenly. In particular, the capacitors of the HB cells will be charged to very low value as compared to the capacitors of the FB cells. The charging value (i.e. the charging level, which may be expressed as a percentage of a capacitor's or cell's rated value) is dependent on the proportion of HB cells and FB cells in the valve arm (or the converter). The lower the number of HB cells in the valve arm, the lower charging level the capacitors of the HB cells are charged to. It will be appreciated that, during this charging period, the HB SM's voltage will appear across the DC terminals and is not zero.

Further, although the FB cells may be charged at a higher level than the HB cells, their charging might still not be sufficient to start switching the devices of the cells (e.g. IGBTs).

In general, in order to start operation of the converter, and in particular to start switching IGBTs of the cells, the capacitors need to be charged to at least 40-50% of their rated value (or also called rated cell voltage). The valve electronics, such as the gate unit's power supply, takes power from the cell capacitor to start operating but they can only start functioning if there is enough energy stored in the capacitors of the cell.

Using valve arms including a mix of HB and FB cells, the charge may then not be enough to start switching the IGBTs of the cell. Further, even if they could switch, the charging level may not be sufficient to meet the AC voltage requirement and, at the same time, keep the DC voltage at zero, which may be an important requirement during startup under certain conditions.

As mentioned above, with a valve arm comprising a mix of HB cells and FB cells, the capacitors of the HB cells and FB cells will charge unequally during the initial charging process. Further, the capacitors of the FB cells and HB cells may be charged to very low values so that they cannot be even switched to start functioning. In order to overcome this problem, the converter may be equipped with a dedicated external power supply taken from the line voltage or having recharged batteries. However, such solutions increase complexity in the construction of the system and involve additional costs.

In the present inventive concept, a startup procedure is provided which overcomes, or at least reduces, the above mentioned problems and, in particular, the problem of low charging of the capacitors of the HB and FB cells.

The inventors have realized that, by electrically connecting the DC terminals of the converter, i.e. by establishing a direct electrical connection between the DC terminals of the converter, the capacitors of the FB submodules are charged to a higher level in comparison to the charging level of the capacitors of the HB submodules when a line-to-line voltage appears across the two phase's positive and negative valve arms, thereby charging the capacitors of the FB submodules connected to these two electrical phase lines to a sufficient level to start operating the switching devices of the FB cells. For illustration purposes, simulations have shown that, for a certain proportion of FB and HB cells, while the charging level of the FB cells and HB cells may reach up to approximately 70% and 35%, respectively, (in percentage of their rated values) if the DC terminals are not electrically connected (i.e. not shorted), the charging level of the FB cells and HB cells may reach almost 80-90% and 0-20%, respectively, if the DC terminals of the converter are electrically shorted. It will be appreciated here that the percentage of charging may depend on an AC pre-insertion resistor chosen for the ac breaker configured to connect or disconnect the converter station with the AC source. This initial energization of the FB cells is then sufficient to start switching/operating the switching devices of the FB cells meeting the required AC and DC voltage requirements. The switching devices of the FB cells may be controlled to charge the capacitors of the HB cells and complete the charging of the capacitors of the FB cells.

It will be appreciated that, as soon as the capacitors of the FB cells are charged to a sufficiently high level (i.e. for switching the devices of the FB cells), the switching devices of an FB cell can be controlled to direct the current in the capacitors of the FB cell in one direction or the other, thereby allowing a control of the charging and the discharging of the capacitors of the FB cell.

It will also be appreciated that during the controlling of the FB cells to charge the capacitors of the HB cells (and the FB cells to some extent), the switching devices of the FB cells may be controlled to generate nominal AC voltages to draw power from the AC power source. During this charging period, the switching of the FB cells can be controlled to generate zero DC voltage across the two DC terminals.

The present inventive concept is therefore based on a charging procedure including an initial phase during which the FB cells are charged to a high level (approximately 90% of their rated value with the DC terminals being electrically shorted) and a subsequent phase (once the FB cells are charged) during which the HB cells are charged from a low level (approximately 0-10%) to a level at which they may start to be operated. The HB submodules and the FB submodules may then be controlled to charge the HB cells to a high level (approximately 100%). The FB cells would then be also charged from an already high level (approximately 80-90%) to almost full charging (i.e. approximately 100%).

As expressed above, an AC voltage may be obtained, from the AC power source and for a certain period of time (i.e. during the initial charging phase or step), between two electrical phase lines for charging capacitors of the FB submodules connected to the two electrical phase lines. It will be appreciated that, during this initial charging phase or step, the capacitors of the HB cells may also be charged, but just a little, i.e. to a much lower value than the capacitors of the FB cells (and not to a level at which the devices of the HB cells can start switching).

After said period of time, or after said initial charging phase of the FB submodules such that the devices of the FB submodules can start switching, the switching devices of the FB submodules may be controlled for charging capacitors of the HB submodules to at least a minimum voltage value at which the HB submodules can start switching, also called the submodule "deblock" voltage (by drawing power from the AC power source).

The HB submodules may then also be switched for charging (all) the FB submodules and the HB submodules to their rated values.

According to an embodiment, the method may further comprise activating control of switching devices of the HB submodules once they are charged to the minimum voltage required to start switching the switching devices of the HB submodules and maintaining a DC voltage at approximately the same level as the level reached before activating the control of the switching devices of the HB submodules. If the DC terminals are still electrically connected to each other, then a zero DC voltage is maintained.

According to an embodiment, the capacitors may be charged by drawing electrical power from the AC power source via the electrical phase lines connected thereto.

According to an embodiment, during charging of the capacitors of the HB submodules, the switching devices of the FB submodules are controlled to (primarily) charge the capacitors of the HB submodules from a very low level (0-10%) to a level at which the HB submodules can start switching, and if possible to a high level (approximately 100%). However, switching of the FB submodules and the HB submodules may be controlled to charge the capacitors of the FB and HB submodules to their rated values.

According to an embodiment, the converter may be configured to support the AC side with reactive power while charging the capacitors of the HB submodules, i.e. once the FB cells have been sufficiently charged and have started to switch.

According to an embodiment, the method may further comprise electrically disconnecting the DC terminals of the converter from each other after that the capacitors of the HB submodules are charged to at least the minimum voltage required to start switching the HB submodules, and electrically connecting the DC terminals to the DC transmission system.

In the present embodiment, the switching devices are controlled such that a zero DC voltage is maintained before disconnecting the DC terminals.

According to another embodiment, the method may further comprise electrically disconnecting the DC terminals of the converter from each other before controlling the switching devices of the FB submodules for charging the capacitors of the HB submodules to at least the minimum voltage required to start switching the devices of the HB submodules, and electrically connecting the DC terminals to the DC transmission system.

According to an embodiment, the method may further comprise starting a DC voltage ramp to a selected value for transferring/receiving electrical power once the DC terminals are connected to the DC transmission system and the capacitors of the FB submodules and the HB submodules are charged to their rated values.

According to an embodiment, for a symmetrical DC power transmission system with mid-point grounding, a first DC terminal of the converter may be connected to a first pole having a positive potential relative to ground and a second DC terminal of the converter may be connected to a second pole having a negative potential relative to ground. In other embodiments, for an asymmetrical system, one of the DC terminal may be connected to a neutral line (or may be a neutral point) and the other DC terminal may be connected to a pole of a higher potential.

According to another aspect, a method of starting operation of a first converter of an HVDC converter station including a second converter connected in series with the first converter is provided.

Connecting two converters in series may allow for a higher availability and reliability, as only part of the total power supply capability may be lost if one of the converters malfunctions. Also, multiple converters connected in series may allow for e.g. transformers connected to the converters to be manufactured having a reduced size. This may offer both a reduced cost and space-requirement as well as an easier transportation of the transformers.

In order to realize high power transfer similar to classic, series connection of converters is required. In the present embodiments, an independent. smoother and online (without disturbing the running system) starting procedure of an individual converter is provided to improve system availability. Operation of the converter at zero DC voltage is preferable in order to have a smooth startup of a converter in series connected system.

In the converter station, the first converter may be a modular multilevel converter connectable, at its DC side, to a DC transmission line of a DC transmission system via a first DC terminal and, via a second DC terminal, to either one of another DC transmission line of the transmission system or a DC terminal of the second converter using a set of connectors (or switches). Further, each valve arm of the first converter includes at least one FB submodule and at least one HB submodule.

The converter station may include a first bypass switch to electrically connect the first and second DC terminals of the first converter and a second bypass switch to bypass the first converter. However, it will be appreciated that the first bypass switch may be optional and that the first and second DC terminals may be electrically connected, i.e. shorted, by closing the second bypass switch and by closing the set of connectors. Other alternatives for shorting the DC terminals may also be envisaged.

Further, the first converter may further include, at its AC side, AC connectors connectable to electrical phase lines of an AC power source.

In the present method (or charging procedure), the second converter is initially in operation to transfer or receive electrical power and directly connected, at its DC side, to the DC transmission system via its two DC terminals. Further, the first converter is electrically disconnected at its DC side from the DC transmission system and from the second converter using the set of connectors. The first converter is also bypassed using the second bypass switch.

In a converter station including series connected converters as mentioned above, a converter may be energized using a similar procedure as one of the procedures described in the preceding embodiments for the case of a single converter in a pole. The present aspect is beneficial in that it allows converters to connect in series with a smoother startup procedure.

More specifically, the method may include establishing a direct electrical connection between the DC terminals of the first converter (for example by closing the first bypass switch) and electrically connecting the first converter to the AC power source. Further, an AC voltage may be obtained, from the AC power source and for a certain period of time, between two electrical phase lines for charging capacitors of the FB submodules connected between the two electrical phase lines. After said period of time, switching devices of the FB submodules may be controlled for charging capacitors of the HB submodules to at least a minimum voltage required to start switching (or to start operating) switching devices of the HB submodules (by drawing power from the AC power source).

According to an embodiment, the DC terminals of the first converter may be electrically disconnected from each other (for example by opening the first bypass switch) after that the capacitors of the HB submodules are charged to at least the minimum voltage required to start switching the devices of the HB submodules. Alternatively, the DC terminals of the first converter may be electrically disconnected before controlling the switching devices of the FB submodules for charging the capacitors of the HB submodules to at least the minimum voltage required to start switching the devices of the HB submodules.

According to an embodiment, the method may further comprise electrically connecting the first DC terminal to the DC transmission line of the DC transmission system and electrically connecting the second DC terminal to a DC terminal of the second converter using the set of connectors.

According to an embodiment, switching devices of the HB and FB submodules of the first converter may be controlled such that a DC current flowing from the DC transmission system through the second bypass switch is directed to the first converter.

Further, the second bypass switch may be opened when the DC current becomes approximately zero through the second bypass switch.

According to an embodiment, a DC voltage across the first converter may be increased to a first selected value to transfer/receive electrical power to/from the DC transmission system.

According to another aspect, a control unit adapted to control the charging of a converter (or a converter station) in accordance with any one of the preceding embodiments is provided.

According to yet a further aspect, a converter station adapted to transfer/receive electrical power is provided. The converter station may include a controller configured to operate at least one converter in accordance with a method as defined in any one of the preceding embodiments.

It will be appreciated that, in the context of the present invention, the converter station may be operable as an inverter and/or as a rectifier, depending on the situation and/or application.

The present disclosure provides also a power transmission system including a converter station as defined in any one of the preceding embodiments.

It will be appreciated that all embodiments described with reference to the first aspect of the present disclosure may be combined with any embodiment described with reference to the other aspects of the present disclosure, and vice versa.

The present disclosure relates to all possible combinations of features recited in the claims. Further objects and advantages of the various embodiments of the present disclosure will be described below by means of exemplifying embodiments.

BRIEF DESCRIPT OF THE DRAWINGS

Exemplifying embodiments will be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structure of the embodiments.

DETAILED DESCRIPTION

Figure 1:
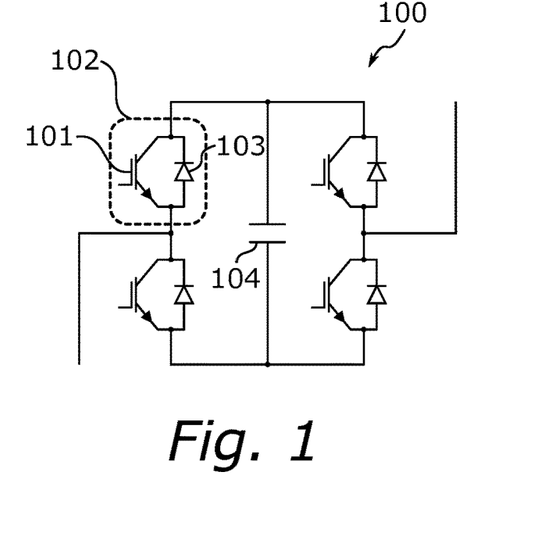
FIG. 1 is a schematic view of a FB cell or submodule.

FIG. 1 illustrates a FB cell or submodule 100. In the FB cell 100, four switch units 102, each including a switching device (for example a self-commutated electronic switching device) such as an insulated-gate bipolar transistor (IGBT) 101 together with a parallel freewheeling diode 103, are connected in an H-bridge configuration together with a charge up capacitor 104. The FB cell 100 may be inserted into a circuit in either polarity.

Figure 2:
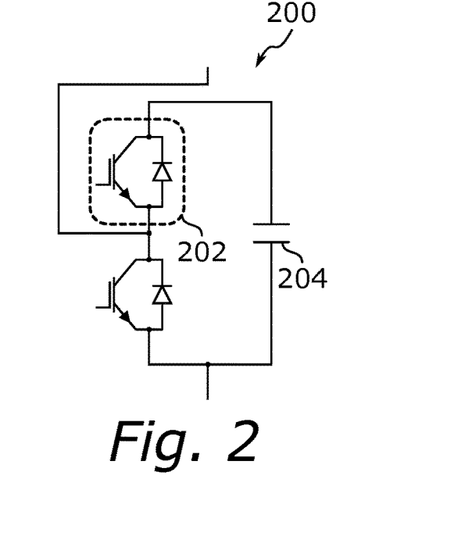
FIG. 2 is a schematic view of a HB cell or submodule.

FIG. 2 illustrates a HB cell or submodule 200. In the sub-cell 200, two switch units 202, which may be equivalent to the switching devices 102 of the FB cell described with reference to FIG. 1, are connected in series together with a parallel charge up capacitor 204. As the HB cell 200 includes a lower number of semiconductors (there are for example only two IGBTs, compared with four for the sub-cell 100 of the FB-MMC), an HB cell is less expensive to fabricate and may offer lower losses. However, HB cell does not provide the same flexibility as an HB cell with respect to polarity.

It will be appreciated that the switching components may not be limited to IGBTs and that they may for example be integrated gate-commutated thyristors (IGCT), Bi-mode insulated gate transistor (BIGT), or the like.

Figure 3:
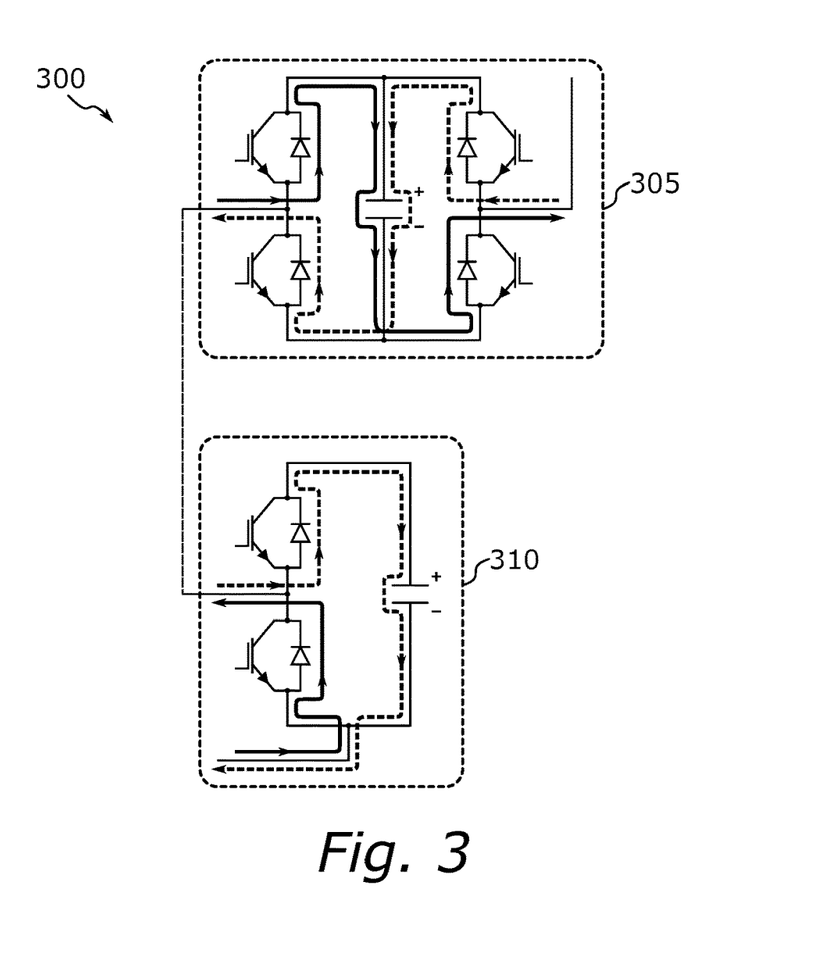
FIG. 3 is a schematic view of a valve arm including one FB cell and one HB cell connected in series, in which figure the flow of current in the cells is illustrated under blocking conditions.

FIG. 3 shows a valve arm 300 including one FB cell 305 and one HB cell 310 connected in series. The FB cell 305 may be equivalent to the FB cell 100 described with reference to FIG. 1 and the HB cell 310 may be equivalent to the HB cell described with reference to FIG. 2.

FIG. 3 illustrates also the flow of current in the cells under blocking conditions, wherein some of the diodes of the switching devices or units of the FB cell 305 and HB cell 310 are forward biased while others are reverse biased. In FIG. 3, the dotted arrow illustrates how the current flows through the valve arm in a first direction while the continuous arrow illustrates the current flow in the opposite direction.

As can be seen, in the current flow indicated by the continuous arrow, the current flows through the capacitor of the FB cell 305 only, while, in the current flow indicated by the dotted arrow, the current flows through both the capacitor of the FB cell 305 and the capacitor of the HB cell 310. Accordingly, under a charging procedure using AC electrical power, the capacitor of the HB cell would only be charged during half time of a period when the AC signal is in e.g. the positive part (corresponding to the direction of the current represented by the dotted arrow) while the capacitor of the FB cell will be charged in both current directions, independently of whether the particular AC phase voltage is positive or negative.

Figure 4:
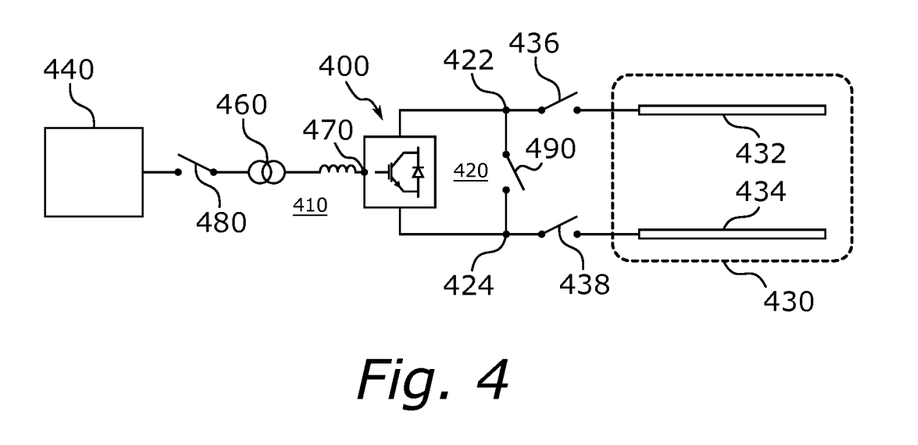
FIG. 4 illustrates a converter station including a single converter in accordance with an embodiment.
Figure 5:
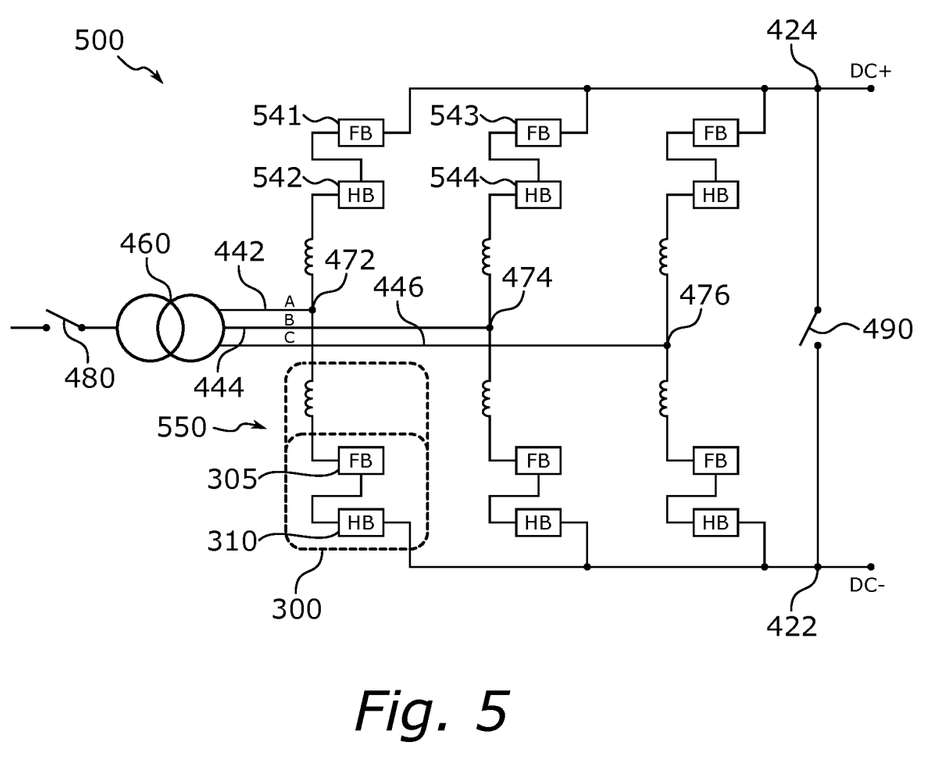
FIG. 5 is a schematic view of a converter station including a single converter such as in FIG. 4, wherein each valve arm includes a mix of a FB cell and a HB cell, according to one embodiment.

FIGS. 4 and 5 illustrate converter stations 400 and 500 according to some embodiments of the present disclosure.

In the present embodiments, the converter station 400 includes one voltage source converter, VSC, which is a modular multilevel converter. The converter station is configured to convert between AC and DC electrical power. The converter station 400 is an HVDC converter station and includes, at a DC side 420, two DC terminals 422, 424 for connection to a DC transmission system 430. The DC transmission system 430 includes two DC transmission lines 432, 434, wherein a first DC transmission line 432 may be referred to as an overhead line neutral and a second DC transmission line 434 may be referred to as an overhead line pole, or vice versa. The voltage across the two DC transmission lines 432 and 434 is the DC voltage, which may be in the range of several hundred of kV. Each DC transmission line 432 and 434 may represent one pole, and it may be assumed that e.g. the DC transmission line 432 is arranged to carry positive DC voltage while the DC transmission line 434 is arranged to carry negative DC voltage with respect to ground.

The DC terminals 422, 424 of the converter station 400 may be connected to the DC transmission system 430 via a set of connectors or switches 436, 438. In particular, a first DC terminal 422 of the converter station 400 may be connected to the first DC transmission line 432 of the DC transmission system 430 via a first switch 436 and a second DC terminal 424 of the converter station 400 may be connected to the second DC transmission line 434 of the DC transmission system 430 via a second switch 438.

Accordingly, the converter station 400 may be connected or disconnected to the DC transmission system 430 by closing or opening, respectively, the first switch 436 and the second switch 438.

The converter station (or converter) 400 includes, at its AC side 410, AC connectors, represented by a common node 470 in FIG. 4 (see FIG. 5 for more details), connectable to electrical phase lines of an AC power source 440 via an AC breaker 480. FIGS. 4 and 5 illustrate also that the converter station 400 may be connected to the AC system (or AC power source) 440 via a transformer 460.

The converter of the converter station 400 may be a MMC and details of an example of the connection of FB cells and HB cells of the MMC are shown in FIG. 5. Further, FIG. 5 illustrates the connection of the electrical phase lines from the AC side with the different valve arms of the converter station 500. In particular, the converter station (or converter in this case as it is a converter station based on a single converter) 400 may include a first AC connector 472 for connection to a first electrical phase line 442, for example carrying an electrical signal of phase A, a second AC connector 474 for connection to a second electrical phase line 444, for example carrying an electrical signal of phase B (different from phase A), a third connector 476 for connection to a third electrical phase line 446, for example carrying an electrical signal of phase C (different from phases A and B).

The converter 500, which may be equivalent to the converter 400 shown in FIG. 4, may include valve arms 550, each being connected between a DC terminal 422 or 424 and an AC connector 472, 474 or 476 for connection to one electrical phase line 442, 444 or 446. Each valve arm 550 includes, in this example, one FB submodule and one HB submodule connected in series, in a configuration which may be equivalent to the electrical circuit 300 described with reference to FIG. 3. The FB submodule may be equivalent to the FB submodule 305 described with reference to FIGS. 1 and 3 and the HB submodule may be equivalent to the HB submodule described with reference to FIGS. 2 and 3.

It will be appreciated that the converter 500 shown in FIG. 5 is just one example and that each valve arm may include a mix of FB cells and HB cells with more than one FB cell and more than one HB cell. Further, the number of HB cells and the number of FB cells in one valve arm may not be the same. The converter might for example include valve arms, wherein a valve arm is a MMC with 25% of FB submodules and 75% of HB submodules, just to provide a further example. For the sake of simplicity in illustrating the present inventive concept, the converter 500 is shown in FIG. 5 to include valve arms each having one FB cell and one HB cell connected in series, together with an inductance 552.

Further, the converter station 400 may include a bypass switch 490 for establishing a direct electrical connection between the DC terminals 422, 424 of the converter station. In other words, the bypass switch 490 may be closed to electrically short (or connect) the first DC terminal 422 with the second DC terminal 424.

It will be appreciated that, with the power transmission system 430, DC power may be transferred from the AC system 440 to another AC system (not shown). The AC systems may include a plurality of transformers, such as the transformer 460 shown in FIG. 4, which may be used to transform between lower and higher AC voltages as necessary. The transformers may in turn be connected to for example turbines, generators, motors or other components which provide and/or consume AC power. The AC system 440 may for example be part of a power plant and the other AC system (not shown) may for example be part of a city, a town, or a factory which consumes the power generated by the power plant. The converter station 400, 500 may then be operated as a rectifier in order to convert from AC to DC while another converter station connected at the other end of the DC transmission system 430 may be operated as an inverter to convert the electrical power back from DC to AC.

Figure 6:
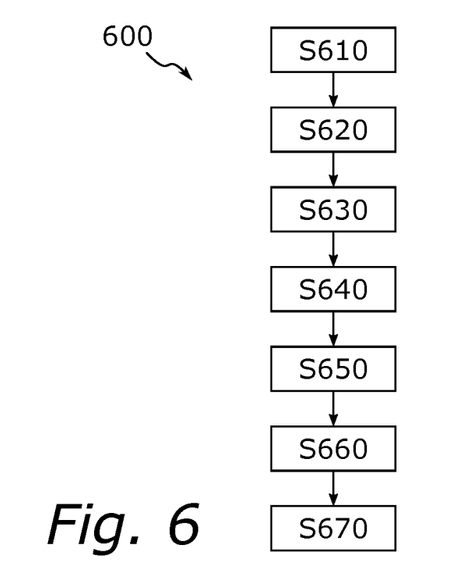
FIG. 6 is a flow chart of a startup procedure for charging a converter station such as shown in for example FIG. 5, according to one embodiment.

With reference to FIG. 6, an embodiment of a method for charging, or a method of starting operation of, a converter of a converter station such as the converter station described with reference to FIGS. 4 and 5, will be described.

FIG. 6 shows a flow chart of such a startup procedure for charging a converter station 400 or 500 such as shown in for example FIGS. 4 and 5, according to one embodiment.

The startup procedure of the HVDC station comprising a mix of FB cells and HB cells includes a first phase during which the DC terminals 422 and 424 of the converter station are electrically connected, or shorted, via the bypass switch 490 and an AC voltage may then be obtained from the AC power source by closing the AC breaker 480 such that the converter station 400, 500 is electrically connected to the AC power source 440. During this initial charging of the converter from the AC power source 440, shorting the DC terminals 422, 424 helps in charging the FB cells to higher value and the HB cells to much lower value (or even almost no charging in some cases) than if the DC terminals 422, 424 would not be shorted.

After this initial charging of the capacitors of the FB cells, i.e. after a certain period of time used for charging the capacitors of the FB cells, the capacitors of the HB cells can be charged in different ways, with the DC terminals 422 and 424 being opened (i.e. with the bypass switch 490 being opened) or with the DC terminals 422 and 424 being shorted (i.e. with the bypass switch 490 being closed).

FIG. 6 illustrates such a procedure in which the DC terminals are first kept shorted, with a zero DC voltage being maintained, and power from the AC power source is drawn to charge the HB cells (similar to a parallel STATCOMs operation). In particular, after the initial charging of the FB cells, the cell voltages of the FB cells (i.e. the charging of the capacitors of the FB cells) will be sufficiently high to start functioning (or "deblock") and generate the reference AC voltages.

During the subsequent charging of the HB cells, the switching devices of the FB cells are controlled such that the FB cells generate the voltage of the HB cells in opposite polarity to maintain a zero DC voltage.

Turning back to FIG. 6 and considering an HVDC converter station 400 or 500 as shown in FIGS. 4 and 5, the charging procedure (or procedure to start operation) of the converter station may be described as follows.

The bypass switch 490 is initially closed at S610 to establish a direct electrical connection between the first DC terminal 422 and the second DC terminal 424. The AC breaker 480 is then simultaneously, or shortly thereafter, at S620 also closed such that an AC voltage is obtained at S630 from the AC power source 440 between two electrical phase lines, for example lines 442 and 444, as shown in FIG. 5, for charging the capacitors of the FB submodules connected to the two electrical phase lines 442 and 444. It will be appreciated that it is the voltage $V_A$-$V_B$, i.e. the AC voltage between the two electrical phase lines 442 and 444, which will generate a current to flow in the FB submodules (and the HB submodules) connected to these two electrical phase lines 442 and 444, thereby enabling the capacitors of the FB cells to charge to a relatively high value. It will be appreciated that during this initial phase of the procedure, the capacitors of the HB submodules might not be charged or just be charged a little.

As explained with reference to FIG. 3, considering the upper valve arm of the A phase, including an FB cell 541 and an HB cell 542, and the upper valve arm of the B phase, including an FB cell 543 and an HB cell 544, if $V_A$-$V_B$ is positive ($V_A$-$V_B$>0), the current may flow in a first direction, for example upwards in the HB cell 542 of the upper valve arm of the A phase leg (or column), through the FB cells 541 and 543 of the upper valve arms of the A and B phases, respectively, and back to the node 474 via the HB cell 544 of the upper valve arm of the B phase. In this current direction, the capacitor of the HB cell 542 of the upper valve arm of the A phase will not be charged while the capacitors of the FB cells 541, 543 and the HB cell 544 will be charged. However, if $V_A$-$V_B$ is negative ($V_A$-$V_B$<0), the current will flow in the opposite direction and, this time, the capacitor of the HB cell 544 of the upper valve arm of the B phase will not be charged while the capacitors of the FB cells 541, 543 and the HB cell 542 will be charged. As a result, the HB cells are charged to a lower level than the FB cells.

Further, without shorting the DC terminals 422 and 424 of the converter station 400, 500, the charging level of the capacitors of the FB cells would reach much lower value than if the DC terminals 422 and 424 are electrically connected via the bypass switch 490. By shorting the DC terminals, the FB cells are charged to a much higher level which is sufficient to start operating/switching the switching devices of the FB cells, while the HB cells are charged to an even lower level or even not charged at all. In the present example, the charging level of the FB cells may reach up to approximately 80-90% of their rated values while the charging level of the HB cells may be as low as approximately 0-10%. It will be appreciated that these values are only for illustration purposes and that the level may vary depending on the mix of HB and FB cells (total number and proportion of HB and FB cells) used in a particular MMC and also on an AC pre-insertion resistor chosen for the AC breaker configured to connect or disconnect the converter station with the AC source.

In a second (or subsequent) phase of the procedure, i.e. after a certain period of time, the switching devices of the FB cells may then be controlled at S640 to charge the capacitors of the HB submodules to at least a minimum voltage required to start switching the devices of the HB submodules. In other words, the capacitors of the HB submodules are charged to voltages higher than the HB submodule's deblock voltage by drawing power from the AC power source. During this charging, a zero DC voltage is maintained and nominal AC voltages are generated by the FB cells. It will be appreciated that a power may be drawn from the AC power source by adjusting the phase difference between the AC source voltage and the converter AC voltages generated by the FB cells. During this charging phase, the FB cells may be charged to reach up to 100% (so from about 80-90% to 100% in the present example) even though most of the charging concerns, or is directed to, the HB cells (which needs to be charged from 0-10% to the level required to start switching the devices of the HB cells). Further, the switching devices of the FB cells may be controlled to direct the current in their respective capacitors in one direction or another, which may result in a charging or discharging of the capacitors, thereby enabling to adjust the charging of the capacitors of the FB cells too.

In other words, enough power is drawn from the AC power source 440 during a certain period of time (to perform the subsequent phase of the charging procedure), thereby allowing the HB cells to charge to their submodule "deblock" voltages. The converter 400, 500 can support the AC system, for example an AC grid, with reactive power during this time.

Once the HB cells are charged to a voltage which is sufficient to start switching, which may be determined by measurements or based on estimations, the HB cells may then be controlled (the devices of the HB submodules may be switched). In other words, the control of the switching devices may be activated at S650 once the HB cells are charged so that they can switch. When the HB cells are "deblocked" (i.e. a gate voltage can be applied from the capacitor to start operating the cell), the DC voltage is maintained at the same level as the level reached before activating the control of the HB cells. In the present procedure, a zero DC voltage is then maintained.

The HB cells may then be controlled, together with the FB cells, in order to charge the HB cells and the FB cells to their rated values, i.e. to an even higher level of charging.

At this moment, the bypass switch 490 may be opened at S660 in order to electrically disconnect the first DC terminal 422 from the second DC terminal 424, i.e. the direct electrical connection established between the two DC terminals is disrupted. The DC terminals 422, 424 may then be electrically connected to the DC transmission system 430 by closing the switches 436 and 438.

The DC voltage may then be increased at S670, e.g. using a specific voltage ramp up, to a selected value and the converter station 400, 500 may start transferring/receiving electrical power to/from the DC transmission system 430. Once the voltages and powers are at ordered values, the startup procedure is complete and the converter station is in operation.

Figure 7:
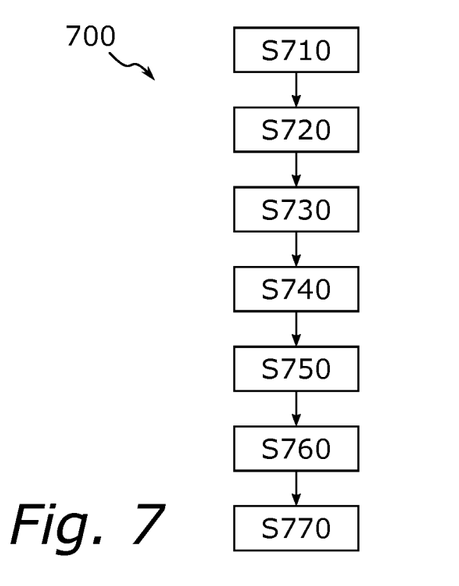
FIG. 7 is a flow chart of a startup procedure for charging a converter station such as shown in for example FIG. 5, according to another embodiment.

FIG. 7 shows a flow chart of a startup procedure for charging a converter station 400 or 500 such as shown in for example FIGS. 4 and 5, according to another embodiment.

The startup procedure may include an initial charging such as described with reference to FIG. 6, wherein the FB cells are charged to a higher value and the HB cells are charged to a lower value with the DC terminals 422 and 424 being electrically connected with each other via the bypass switch 490. In other words, the first phase of the procedure of the method described with reference to FIG. 6, as represented by steps S610, S620 and S630 in FIG. 6, is equivalent to the first phase of the procedure of the method now described with reference to FIG. 7, as represented by steps S710, S720 and S730.

The difference between the present startup procedure described with reference to FIG. 7 and the startup procedure described with reference to FIG. 6 is that the DC terminals are not electrically connected, i.e. the bypass switch 490 is opened, during the second (or subsequent) phase of the procedure. All other steps are otherwise similar to the steps of the procedure described with reference to e.g. FIG. 6, as further described below. In this embodiment, the FB cells need not compensate for the HB cells voltage during the second phase of the charging and the DC voltage upon the DC terminals will be based on the HB cells voltage.

Accordingly, in a second phase of the startup procedure shown in FIG. 7, the bypass switch 490 may be opened at S740 in order to electrically disconnect the first DC terminal 422 from the second DC terminal 424, i.e. the direct electrical connection established between the two DC terminals is disrupted. The DC terminals 422, 424 may then be electrically connected to the DC transmission system 430 by closing the switches 436 and 438.

The switching devices of the FB cells may then be controlled at S750 to charge the capacitors of the HB submodules to at least a minimum value required to start switching the switching devices of the HB submodules, i.e. to voltages higher than the HB submodule's "deblock" voltage by drawing power from the AC power source. During this charging, the DC voltage is initially zero and can then be let uncontrolled. Further, nominal AC voltages are generated by the FB cells. It will be appreciated that, in this alternative procedure, a power may also be drawn from the AC power source by adjusting the phase difference between the AC signal and the nominal AC voltages generated by the FB cells. As for the startup procedure described with reference to FIG. 6, during this charging phase, the FB cells might be charged to a higher level and reach up to 100% (so from about 80-90% to 100% in the present example) even though most of the charging concerns the HB cells (which needs to be charged from 0-10% to 100% in the present example). Further, the switching devices of the FB cells may be controlled to direct the current in their respective capacitors in one direction or another, which may result in a charging or discharging of the capacitors, thereby enabling to adjust the charging level of the FB cells. The converter station may support the AC system 440 with reactive power during this time.

In other words, enough power is drawn from the AC power source 440 during a certain period of time, thereby allowing the HB cells to charge to a higher level than the level required for "deblocking" the HB cells. As mentioned above, the converter 400, 500 can support the AC system, for example an AC grid, with reactive power during this time.

Once the HB cells are charged to the level required to start switching the switching devices of the HB submodules, which may be determined by measurements or based on estimations, the HB cells may be controlled. In other words, the control of the switching devices may be activated at S760 once the HB cells are charged so that they can switch. When the HB cells are "deblocked", the DC voltage is maintained at the same level as the level reached before activating the control of the HB cells.

The HB cells and the FB cells may then be controlled so that the capacitors of the HB cells and the FB cells are charged to their rated values, or at least to an even higher level.

The DC voltage may then be increased at S770, e.g. using a specific voltage ramp up, to a selected (or ordered) value and the converter station 400, 500 may start transferring/receiving electrical power to/from the DC transmission system 430. Once the voltages and powers are at ordered values, the startup procedure is complete and the converter station is in operation.

Figure 8:
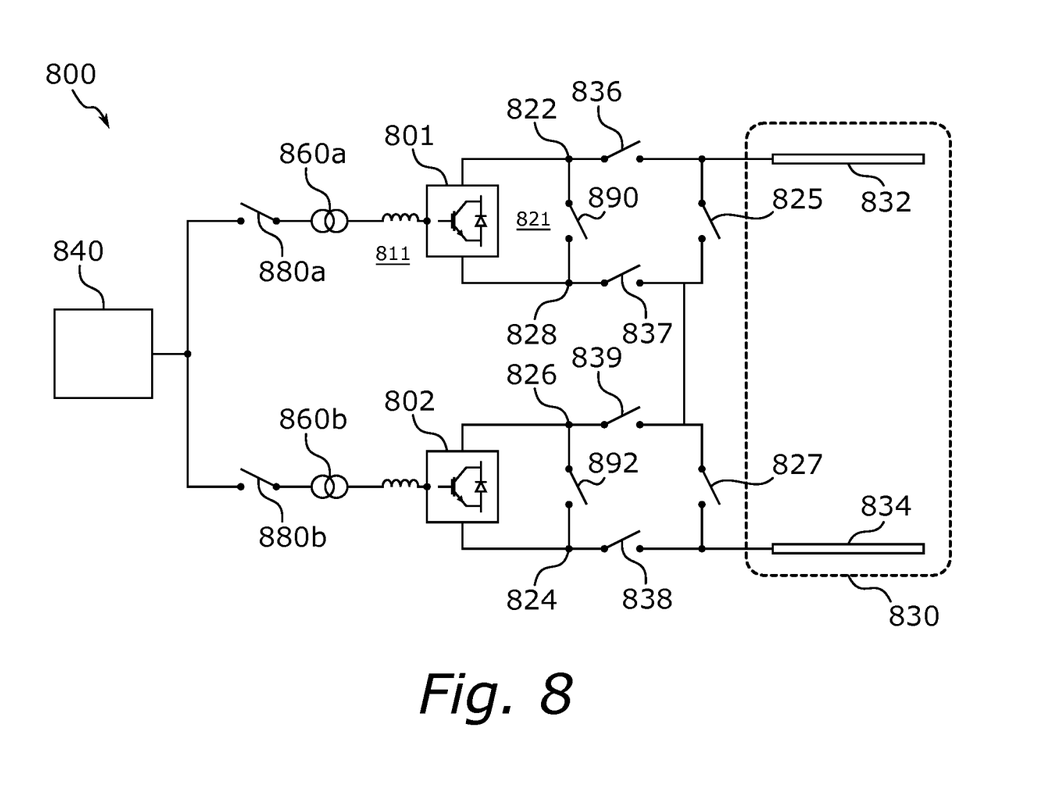
FIG. 8 is a schematic view of a converter station including two series-connected VSCs according to an embodiment.
Figure 9:
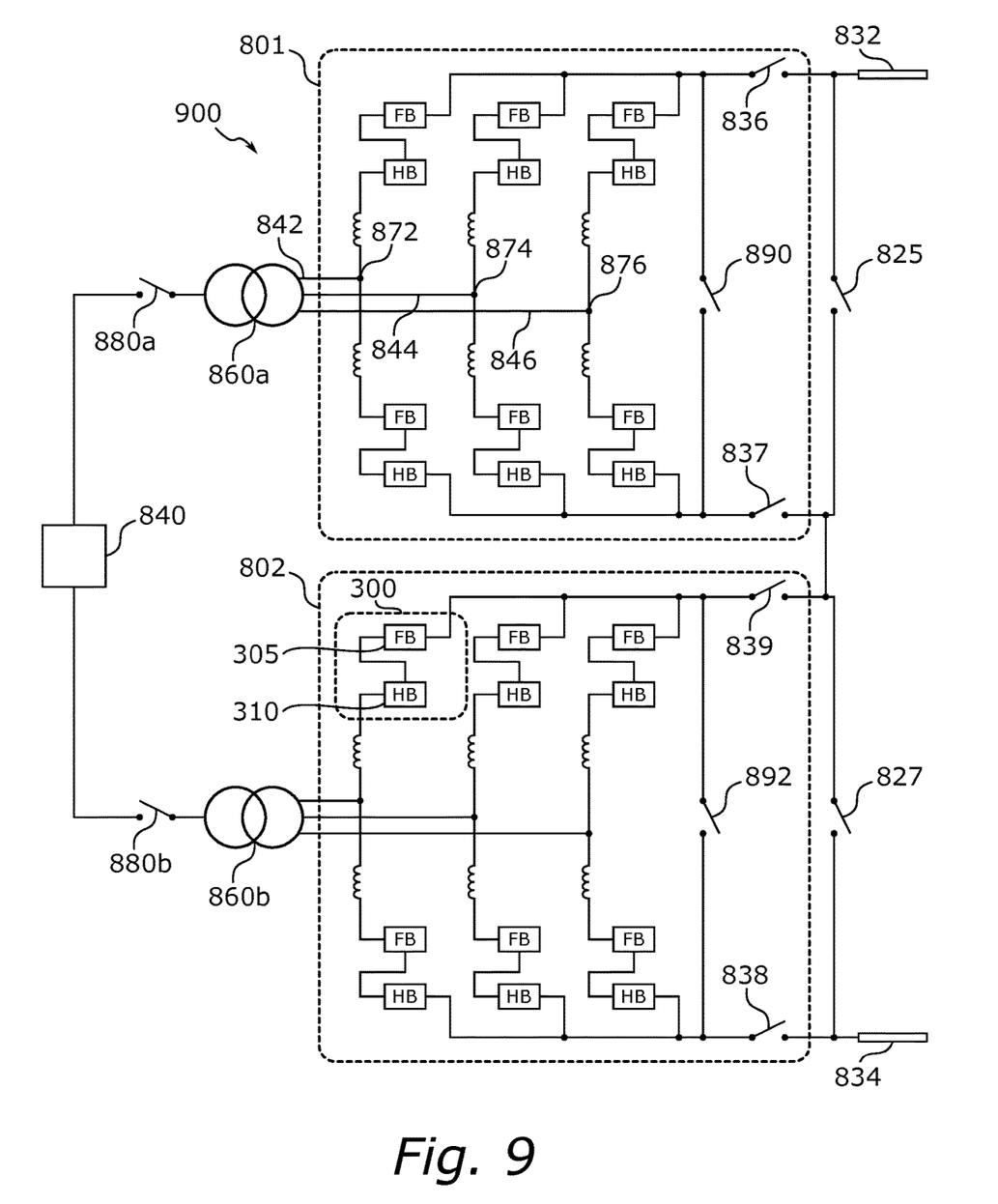
FIG. 9 is a schematic view of a converter station including two series-connected VSCs, such as in FIG. 8, wherein each valve arm includes a mix of a FB cell and a HB cell, according to one embodiment.

With reference to FIGS. 8 and 9, converter stations 800 or 900 including two series-connected VSCs are described.

FIG. 8 shows a schematic view of a converter station 800 including a first converter 801 connected in series with a second converter 802. The converter station 800 may be connected between a first overhead line or DC transmission line 832 and a second overhead line or DC transmission line 834 of a DC transmission system 830. The DC transmission lines 832 and 834 and the DC transmission system 830 may be equivalent to the DC transmission lines 432 and 434 and the DC transmission system 430 described with reference to FIGS. 4 and 5.

Further, each of the first and second converters 801 and 802 may be equivalent to the converters 400, 500 described with reference to FIGS. 4 and 5.

In particular, the first converter 801 may include a MMC with a DC side 821, an AC side 811, a first DC terminal 822, a second DC terminal 828, an optional first bypass switch 890 (for shorting the DC terminals 822, 828) and a set of switches/connectors 836, 837 (for connection to the DC transmission system 830) and/or the second converter 802, which may be equivalent to the MMC described with reference to FIGS. 4 and 5 with a DC side 420, an AC side 410, a first DC terminal 422, a second DC terminal 424, a first bypass switch 490 and a set of switches/connectors 436, 438, respectively. Therefore, not all details described with reference to FIGS. 4 and 5 are repeated here.

At the AC side 811, the first converter 801 may be connected to an AC power source 840 by activating (or closing) an AC breaker 880a. A transformer 860a may also be arranged between the first converter 801 and the AC power source 840.

Similarly, the second converter 802 may include a MMC with a DC side, an AC side, a first DC terminal 826, a second DC terminal 824, an optional first bypass switch 892 (for shorting the DC terminals 824, 826), and a set of switches 838, 839 (for connection to the DC transmission system 830), which may be equivalent to the MMC described with reference to FIGS. 4 and 5 with a DC side 420, an AC side 410, a first DC terminal 422, a second DC terminal 424, a first bypass switch 490 and a set of switches 436, 438.

At its AC side, the second converter 802 may be connected to an AC power source 840 by activating (or closing) an AC breaker 880b. A transformer 860b may also be arranged between the second converter 802 and the AC power source 840.

In the converter station including two series-connected VSCs, the second DC terminal 828 of the first converter 801 may be connected to the first DC terminal 826 of the second converter station 802 via the switches 837 and 839 of the converter station.

The converter station 800 is also equipped with a second bypass switch 825 to bypass the first converter 801. The DC transmission line 832 may then be directly connected to the second converter 802, using the second bypass switch 825 and also the switch 839. Similarly, the converter station 800 is equipped with another bypass switch 827 to bypass the second converter 802. The DC transmission line 834 may then be directly connected to the first converter 801, using the bypass switch 827 and also the switch 837.

FIG. 9 shows a converter station 900 which may be equivalent to the converter station 800 described with reference to FIG. 8 except that further details are provided with respect to the construction of the MMC.

FIG. 9 shows a particular example in which each valve arm of the converters 801 or 802 includes one FB cell and one HB cell connected in series, in a similar manner as what was shown in, and described with reference to, FIG. 5 for a converter station including a single converter.

FIG. 9 shows that the first converter 801 may include AC connectors 872, 874, 876 for connection of the first converter 801 to the AC electrical phase lines 842, 844 and 846, respectively.

As already explained in connection to FIG. 5 for the single converter case, the present embodiments are however not limited to the specific number and arrangement of FB cells and HB cells shown in FIG. 9. Other number and mix of FB cells and HB cells may be envisaged.

Figure 10:
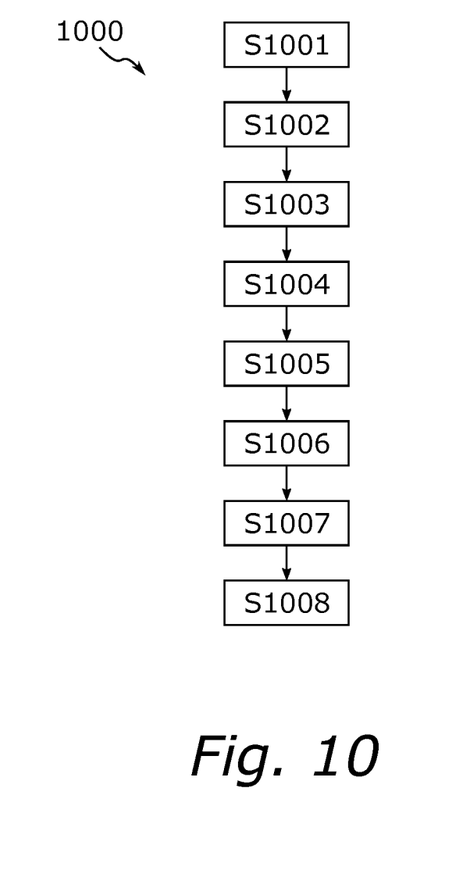
FIG. 10 is a flow chart of a procedure for starting operation of one of two series-connected converters of a converter station.

FIG. 10 shows a flow chart of a method 1000 for starting operation (and online switching in) of the first converter 801 in the converter station 800, 900. The converter 801 may be energized according to a procedure which is rather similar to the procedures described with reference to FIGS. 6 and 7, as set forth below. In particular, the charging procedure for the capacitors of the HB cells and the FB cells can be similar to the charging procedures 600 and 700 described with reference to FIGS. 6 and 7 for the single converter.

In this case, once the HB and FB cells of the incoming converter, i.e. the converter to be energized, which may be the first converter 801 in the present example, are charged to a level at which the switching devices of the FB cells and HB cells can start switching, the incoming converter 801 can control the DC current through the bypass switch 825 to zero resulting in complete diversion of the DC line current into the converter 801.

Turning to FIG. 10, an example of a procedure to startup (or bring/switch in) the first converter 801 having a mix of HB and FB cells in a valve arm for operation in a system configuration with series connection of converters is described.

As a pre-condition, the bypass switch 825 and the disconnectors (or switches) 839 and 838 are closed such that the second converter 802 is in operation and transferring or receiving electrical power to/from the DC transmission system. The first converter 801 is then bypassed.

The connectors or switches 836 and 837 (which may also be referred to as "disconnectors", depending on their state, i.e. depending on whether they are activated to connect or disconnect two elements) are opened such that the first converter 801 is disconnected from the DC transmission system 830 and the second converter 802.

As described with reference to FIGS. 1-6, during an initial phase, a direct electrical connection is established at S1001 between the DC terminals 822 and 828 of the first converter 801. This direct electrical connection between the DC terminals 822 and 828 may be established by closing the optional first bypass switch 890. However, other alternatives may be envisaged. For example, the DC terminals 822 and 828 may be shorted (i.e. a direct electrical connection is established between the terminals 822 and 828) by closing the second bypass switch 825 and the connectors 836 and 837.

Further, the first converter 801 is electrically connected at S1002 to the AC power source 840 by closing the AC breaker 880a. An AC voltage may then be obtained at S1003, from the AC power source 840 and for a certain period of time, between two electrical phase lines, for example electrical lines 842 and 844, for charging capacitors of the FB submodules connected between these two electrical phase lines. After said period of time (or after said initial charging phase), the switching devices of the FB submodules may be controlled at S1004 for charging capacitors of the HB submodules to at least a minimum voltage at which the switching devices of the HB submodules can start switching, in particular by drawing power from the AC power source.

The charging procedure then follows either one of the procedures described with reference to FIG. 6 or 7, i.e. with the DC terminals being electrically disconnected at S1005 either after that the capacitors of the HB submodules are charged to voltages higher than the above mentioned minimum voltage (FIG. 6) or before controlling the switching devices of the FB submodules for charging the capacitors of the HB submodules to voltages higher than the above mentioned minimum voltage (which is the HB submodule's "deblock" voltage) (FIG. 7). It will be appreciated that the DC terminals 822 and 828 may be electrically disconnected (i.e. not shorted) by opening the optional first bypass switch 890, if the converter station includes such a bypass switch, or by opening one of the connectors 836 and 837 for example, if these connectors and the second bypass switch 825 were used to short the DC terminals 822 and 828.

In one embodiment, the DC terminals may be kept connected, with for example the optional first bypass switch 890 closed, as in the procedure described with reference to FIG. 6. The first bypass switch 890 may then be opened after having closed the connectors 836 and 837 and having diverted the line current. In another embodiment, the DC terminals are electrically disconnected by opening the optional first bypass switch 890 before controlling the switching device of the FB SMs for charging the capacitors, as in the procedure described with reference to FIG. 7. It will be appreciated that the use of the first bypass switch is only optional. As mentioned above, other switches and connectors, involving for example the second bypass switch 825, may have been used to short the DC terminals. Accordingly, these other switches and connectors may be used to electrically disconnect the terminals.

The method 1000 may then further comprise at S1006 electrically connecting the first DC terminal 836 to the DC transmission line 832 of the DC transmission system 830 using the disconnector or switch 836 and electrically connecting the second DC terminal 828 of the first converter 801 to a DC terminal 826 of the second converter 802 using the disconnector or switch 837.

At S1007, once the first and second DC terminals 822 and 828 of the first converter 801 are connected to the DC transmission system 830 and a DC terminal 826 of the second converter 802, respectively, the switching devices of the HB and FB submodules of the first converter 801 may be controlled such that a DC current flowing from the DC transmission system 830 through the second bypass switch 825 is directed (or diverted) to the first converter 801.

At S1008, the second bypass switch 825 is opened when the DC current becomes zero across the second bypass switch 825 and a DC voltage across the first converter 801 is then increased to a first selected value to transfer/receive electrical power to/from the DC transmission system 830.

It will be appreciated that the DC voltage applied to the first converter may be increased slowly at the same time as the first converter start transferring/receiving active power. Further, in case of a DC voltage applied to a converter in a converter station (not shown) introduced at another end of the DC transmission system 830, the first converter 801 shall be ramped up at the same time and at same rate as this other converter.

The startup procedure may be complete when the voltages and powers are at ordered values.

Although not shown in the figure, according to an embodiment, the converter station may be connectable, via a DC transmission link, to another converter station of the same type and arrangement. The converter station may then be operable as an inverter and/or a rectifier.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of starting operation of a converter of a high voltage direct current (HVDC) converter station, wherein said converter is a modular multilevel converter (MMC) including, at a direct current (DC) side, two DC terminals for connection to a DC transmission system and, at an alternating current (AC) side, AC connectors connectable to electrical phase lines of an AC power source, wherein said converter includes valve arms each connected between a DC terminal and an AC connector for connection to one electrical phase line, wherein each valve arm includes at least one full-bridge (FB) submodule and at least one half-bridge (HB) submodule connected in series, said method comprising:
   establishing a direct electrical connection between the DC terminals of the converter;
   after establishing the direct electrical connection between the DC terminals, electrically connecting the converter to the AC power source via said AC connectors;
   obtaining, from the AC power source and for a certain period of time, an AC voltage between two electrical phase lines for charging capacitors of the FB submodules connected to said two electrical phase lines; and
   controlling, after said period of time, switching devices of the FB submodules for charging capacitors of the HB submodules to at least a minimum voltage required to start switching devices of the HB submodules.

2. The method of claim 1, further comprising activating control of switching devices of the HB submodules once the capacitors of the HB submodules are charged to at least said minimum voltage and maintaining the at least said minimum voltage at approximately the same level as the level reached before said activating control of the switching devices of the HB submodules.

3. The method of claim 2, wherein the capacitors of the HB submodules are charged by drawing electrical power from the AC power source via the electrical phase lines connected thereto.

4. The method of claim 3, wherein the converter is configured to support the AC side with reactive power while charging the capacitors of the HB submodules to at least said minimum voltage.

5. The method of claim 4, further comprising:
   electrically disconnecting the DC terminals of the converter from each other after the capacitors of the HB submodules are charged to at least said minimum voltage; and
   electrically connecting the DC terminals to the DC transmission system.

6. The method of claim 4, further comprising:
   electrically disconnecting the DC terminals of the converter from each other before controlling the switching devices of the FB submodules for charging the capacitors of the HB submodules to at least said minimum voltage, and
   electrically connecting the DC terminals to the DC transmission system.

7. The method of claim 6, further comprising starting a DC voltage ramp to a selected value for transferring/receiving electrical power once the DC terminals are connected to the DC transmission system and the capacitors of the FB submodules and the HB submodules are charged to their rated values.

8. The method of claim 6, wherein establishing the direct electrical connection between the DC terminals of the converter comprises operating a bypass switch of the direct electrical connection to directly connect the first DC terminal with the second DC terminal; and
wherein electrically disconnecting the DC terminals of the converter from each other comprises operating the bypass switch to disconnect the first DC terminal with the second DC terminal.

9. The method of claim 1, wherein establishing the direct electrical connection between the DC terminals of the converter comprises operating a bypass switch of the direct electrical connection to directly connect the first DC terminal with the second DC terminal.

10. The method of claim 1, wherein obtaining the AC voltage between two electrical phase lines causes the charging capacitors of the FB submodules to charge to at least approximately 80% of the rated values of the charging capacitors of the FB submodules, and causes the capacitors of the HB submodules to charge to at most approximately 20% of the rated values of the capacitors of the HB submodules.

11. The method of claim 10, wherein controlling the switching devices of the FB submodules for charging the capacitors of the HB submodules causes the charging capacitors of the FB submodules to fully charge and causes the capacitors of the HB submodules to fully charge.

12. A method of starting operation of a first converter of an HVDC converter station including a second converter connected in series with said first converter, wherein said first converter is a modular multilevel converter connectable, at its DC side, to a DC transmission line of a DC transmission system via a first DC terminal and, via a second DC terminal, to either one of another DC transmission line of said transmission system or a DC terminal of the second converter using a set of connectors, wherein each valve arm of the first converter includes at least one FB submodule and at least one HB submodule, wherein said converter station includes a bypass switch to bypass the first converter, wherein the first converter further includes, at its AC side, AC connectors connectable to electrical phase lines of an AC power source, wherein the second converter is initially in operation to transfer or receive electrical power and directly connected, at its DC side, to said DC transmission system via its two DC terminals, wherein the first converter is bypassed and electrically disconnected at its DC side from said DC transmission system and from the second converter using said set of connectors, said method including:
establishing a direct electrical connection between the DC terminals of the first converter;
after establishing the direct electrical connection between the DC terminals, electrically connecting the first converter to the AC power source;
obtaining, from the AC power source and for a certain period of time, an AC voltage between two electrical phase lines for charging capacitors of the FB submodules connected between said two electrical phase lines; and
controlling, after said period of time, switching devices of the FB submodules to charge capacitors of the HB submodules to at least a minimum voltage required to start switching devices of the HB submodules.

13. The method of claim 12, wherein said method includes electrically disconnecting the DC terminals of the first converter from each other after the capacitors of the HB submodules are charged to at least said minimum voltage or electrically disconnecting the DC terminals of the first converter from each other before controlling the switching devices of the FB submodules to charge the capacitors of the HB submodules to said at least minimum voltage.

14. The method of claim 13, further comprising electrically connecting the first DC terminal to the DC transmission line of the DC transmission system and electrically connecting the second DC terminal to a DC terminal of the second converter using said set of connectors.

15. The method of claim 14, further comprising, once the first and second DC terminals of the first converter are connected to the DC transmission system and a DC terminal of the second converter, respectively, controlling switching devices of the HB and FB submodules of the first converter such that a DC current flowing from the DC transmission system through the bypass switch is directed to the first converter.

16. The method of claim 15, further comprising opening the bypass switch when the DC current becomes approximately zero across said bypass switch and increasing a DC voltage across the first converter to a first selected value to transfer/receive electrical power to/from the DC transmission system.

17. The method of claim 16, wherein the converter station further includes another bypass switch to establish a direct electrical connection between the first and second DC terminals of the first converter.

18. The method of claim 17, wherein establishing the direct electrical connection between the DC terminals of the first converter comprises operating the another bypass switch of the direct electrical connection to directly connect the first DC terminal with the second DC terminal of the first converter.

19. A modular multilevel (MMC) converter of a high voltage direct current (HVDC) converter station, comprising:
a direct current (DC) side comprising two DC terminals for connection to a DC transmission system;
an alternating current (AC) side, comprising AC connectors connectable to electrical phase lines of an AC power source;
valve arms that are each connected between a DC terminal and an AC connector for connection to one electrical phase line, wherein each valve arm includes at least one full-bridge (FB) submodule and at least one half-bridge (HB) submodule connected in series; and
a control unit configured to:
establish a direct electrical connection between the DC terminals of the converter;
after establishment of the direct electrical connection between the DC terminals, electrically connect the converter to the AC power source via said AC connectors;
obtain, from the AC power source and for a certain period of time, an AC voltage between two electrical phase lines for charging capacitors of the FB submodules connected to said two electrical phase lines; and
control, after said period of time, switching devices of the FB submodules for charging capacitors of the HB submodules to at least a minimum voltage required to start switching devices of the HB submodules.

20. A high voltage direct current (HVDC) converter station, comprising:

a first converter connected in series to a second converter of the HVDC converter station, wherein the first converter is a modular multilevel converter connectable, at its direct current (DC) side, to a DC transmission line of a DC transmission system via a first DC terminal and, via a second DC terminal, to either one of another DC transmission line of said transmission system or a DC terminal of the second converter using a set of connectors, wherein each valve arm of the first converter includes at least one full-bridge (FB) submodule and at least one half-bridge (HB) submodule;

a bypass switch that operates to bypass the first converter, wherein the first converter further includes, at its AC side, AC connectors connectable to electrical phase lines of an AC power source, wherein the second converter is initially in operation to transfer or receive electrical power and directly connected, at its DC side, to said DC transmission system via its two DC terminals, wherein the first converter is bypassed and electrically disconnected at its DC side from said DC transmission system and from the second converter using said set of connectors; and a controller configured to:
  establish a direct electrical connection between the DC terminals of the first converter;
  after establishment of the direct electrical connection between the DC terminals, electrically connect the first converter to the AC power source;
  obtain, from the AC power source and for a certain period of time, an AC voltage between two electrical phase lines for charging capacitors of the FB submodules connected between said two electrical phase lines; and
  control, after said period of time, switching devices of the FB submodules to charge capacitors of the HB submodules to at least a minimum voltage required to start switching devices of the HB submodules.

* * * * *